Aug. 1, 1961 — H. LANGSTROTH — 2,994,243
FASTENING DEVICE
Filed May 2, 1958

INVENTOR.
HALL LANGSTROTH
BY *Hall Langstroth*

United States Patent Office 2,994,243
Patented Aug. 1, 1961

2,994,243
FASTENING DEVICE
Hall Langstroth, 1454 Alegriano Ave., Coral Gables, Fla.
Filed May 2, 1958, Ser. No. 732,748
1 Claim. (Cl. 85—40)

This invention relates to a fastening device and more particularly to a device which can be driven into or through various types of construction materials. The mentioned fastening device allows for self piercing and expanding after insertion. It is an object of this invention to provide a hard pointed tip to the fastening device which facilitates driving the fastening device into hard materials. The mentioned fastening device can be driven in place with the use of a hand driving tool and hammer or by power tools performing like operations.

Figure 1:
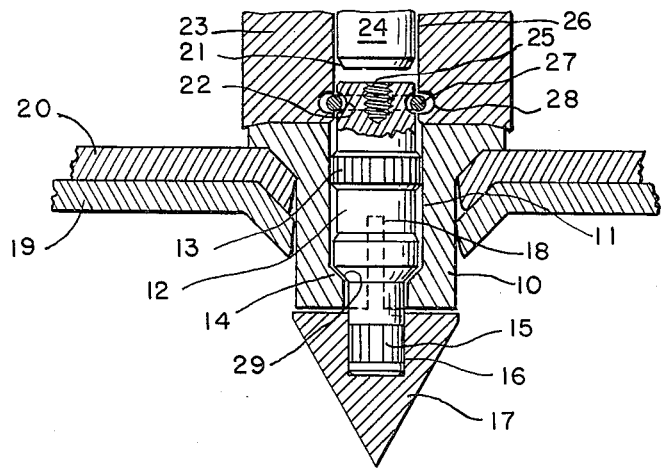
Figure 2:
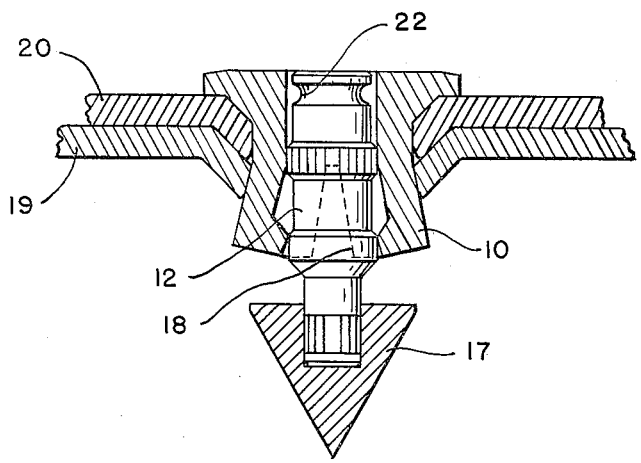

Another object and advantage of the invention will appear more clearly from the following description of the preferred embodiments and from the drawings in which FIG. 1 shows a vertical sectional view of the fastening device and driving tool embodying the invention. The fastening device in FIG. 1 is shown driven through two plates as the first operation. FIG. 2 shows a vertical cross section of the fastening device as expanding in the final position.

Referring to the drawing in detail, FIG. 1 shows a fastening device having a shouldered housing 10 inserted through two plates 19 and 20. The shouldered housing 10 is cylindrically shaped with a hollow interior bore 11 which forms a cylinder; the interior bore 11 includes conical taper 14 located in the base of bore 11. Pin 12 is contained centrally within bore 11 having a mating conical taper 29 which engages conical taper 14 in bore 11. Slot 18 is provided to weaken the cylinder wall section at the base of shouldered housing 10. Knurled portion 15 at the bottom end of pin 12 is provided to allow for a tight fit with cylindrical recess 16 in cone tip 17. Knurled section 13 on pin 12 is provided to maintain concentricity and to frictionally engage the inner bore of housing 10. The top end of pin 12 is provided with an internally threaded recess bore 26 for means of attaching screws to the mentioned fastening device.

A driving tool shown in FIG. 1 comprises a hollow cylindrically shaped sleeve 23, the interior wall of the sleeve 23 forms a cylinder 25 in which is located a reciprocable piston 24 which has a chamfer 21 at the bottom end; piston 24 is used to drive pin 12 to a position shown in FIG. 2. Circular C spring 27 is retained in circular groove 28; annular groove 22 in pin 12 allows C spring 27 to engage annular groove 22. C spring 27 when engaged in groove 22 frictionally holds pin 12 and sleeve 23 together.

FIG. 2 shows the fastening device in an expanded position which is accomplished by driving pin 12 flush with the head of shouldered housing 10. Conical taper 29 or pin 12, when displaced to the position shown in FIG. 2, urges the base of housing 10 to expand in conjunction with slot 18 which weakens the cylindrical wall at the base of housing 10.

The tip 17 should be made of a more durable substance than the material to be pierced. The pin 12, by preference of design, can be made of a harder material than the housing 10 which must have sufficient ductility to withstand the expanding action resulting from driving pin 12 into housing 10.

The outside diameter of the driving sleeve 23 can exceed the head diameter of shouldered housing 10 so that the driving sleeve 23 and the mentioned fastening device can be inserted in a barrel tube for power driving.

The said fastening device allows for one or more parts to be held together without having to drill a hole prior to insertion. As driven in place, the expanded base of shouldered housing 12 in FIG. 2 prevents removal and assures a tight joint. The said fastening device can be driven into wood, plastics, metals and other construction materials for the purpose of joining or attaching component parts together.

When driven into thick materials for anchoring purposes, it may be desirable to eliminate the shoulder on housing 10 as the depth of penetration is not an exacting requirement.

It is to be understood that, although the invention has been described with specific reference to particular embodiments thereof, it is not to be so limited since changes and alterations therein may be made which are within the full intended scope of this invention as defined by the appended claim.

I claim:

A fastening device comprising; a housing, said housing comprising a shank having a uniform external diameter, an enlarged head at one end thereof, the other end of said shank being of flat surface at a right angle to the axis of said shank, said shank being formed with longitudinal slots extending from said other end, said housing having a centrally located bore therethrough, said bore having an upper cylindrical portion, a lower cylindrical portion of reduced diameter relative to said upper portion and a frustro conical portion connecting said upper and lower portions; and a pin extending through said bore having a major dimension conforming in diameter to the upper bore portion in said housing, said pin projects above said enlarged end and beyond said other end, said pin having a frustro conical shoulder complementary to said frustro conical bore portion, said end portion which project beyond said shank other end having attached thereto a cone piercing tip, the base of said cone tip being flat and at a right angle to the axis of said shank and being disposed in abutting relation to said shank's other end; the diameter of the base of said cone tip is at least equal to the shank diameter of said housing, the force required to drive said cone tip through constructional material is applied to said enlarged head and is transmitted through said housing to said tip, said pin is subsequently driven inward to engage said frustro conical surfaces to extend said other end of said housing.

References Cited in the file of this patent

UNITED STATES PATENTS

| | | |
|---|---|---|
| 547,988 | Bull | Oct. 15, 1895 |
| 1,816,970 | Hess | Aug. 4, 1931 |
| 1,840,928 | Anthony | Jan. 12, 1932 |
| 2,355,513 | Cox | Aug. 8, 1944 |
| 2,432,949 | Thorgren | Dec. 16, 1947 |
| 2,744,437 | Murphy | May 8, 1956 |